United States Patent [19]
Hunt

[11] 3,735,117
[45] May 22, 1973

[54] ELECTRIFIED PLASTIC CHRISTMAS TREE

[76] Inventor: John W. E. Hunt, Norway House, Manitoba, Canada

[22] Filed: Mar. 9, 1972

[21] Appl. No.: 233,073

[52] U.S. Cl. ............................................. 240/10 T
[51] Int. Cl. ....................... A47g 33/06, A47g 33/16
[58] Field of Search ............................... 240/10 T

[56] References Cited

UNITED STATES PATENTS

2,188,529   1/1940   Corina ............................ 240/10 T
3,603,780   9/1971   Lu .................................. 240/10 T X

FOREIGN PATENTS OR APPLICATIONS

573,350   11/1945   Great Britain ................. 240/10 T

Primary Examiner—Joseph F. Peters, Jr.

[57] ABSTRACT

An artificial christmas tree having an electrical circuit built into it so to eliminate dangling wiring hanging visibly from the tree branches; the tree including a tree trunk supported at its lower end on a tree stand, a series of sidewardly radiating tree branches supporting twigs with needles, and the trunk and branches having electrical wiring therewithin leading from a transformer in the tree stand to electric lamp sockets scattered upon the twigs and branches, the transformer being connected by an extension cord and plug to an electric power source of a house.

1 Claim, 8 Drawing Figures

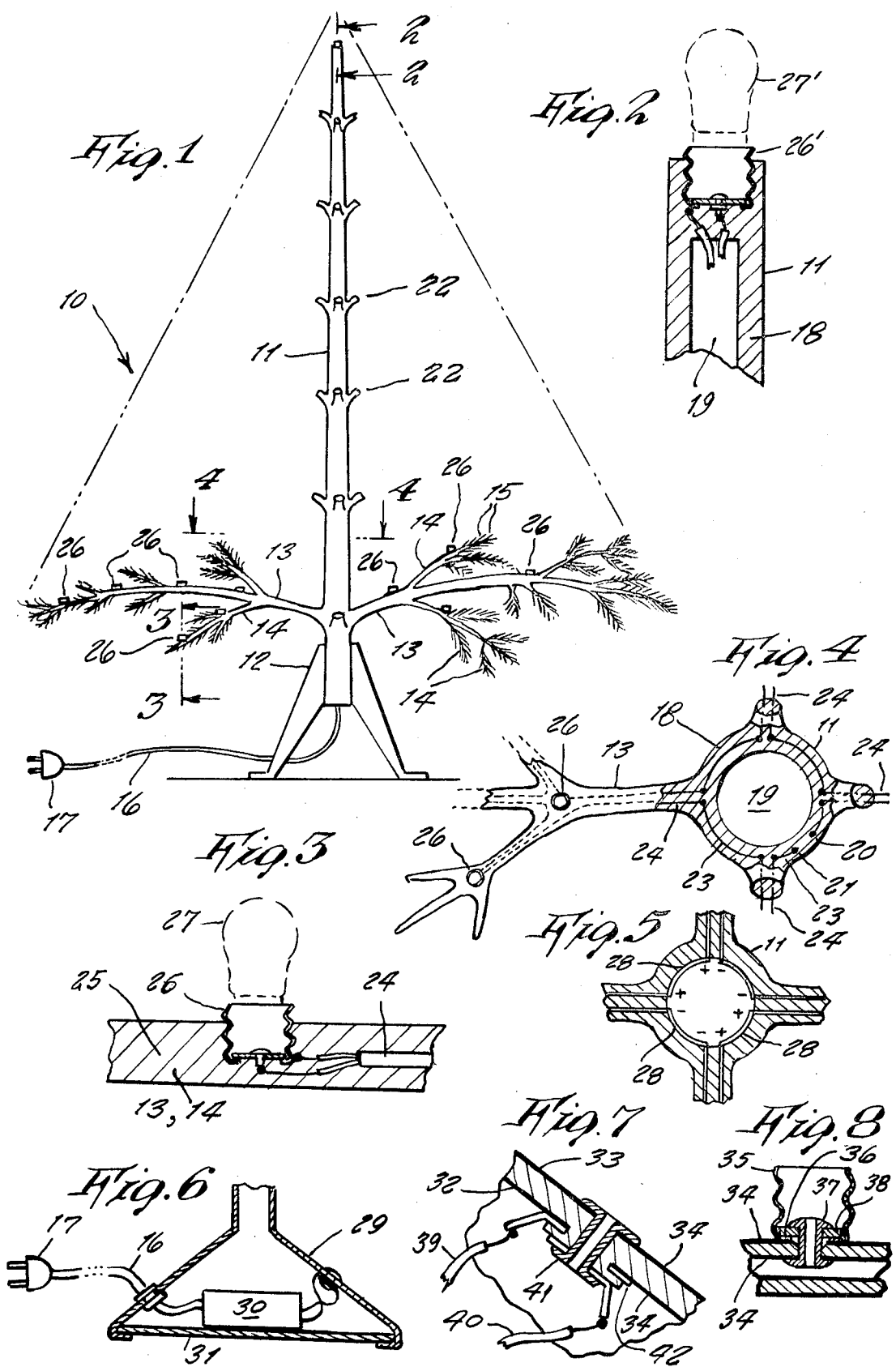

ELECTRIFIED PLASTIC CHRISTMAS TREE

This invention relates to artificial Christmas trees.

A principal object is to provide an artificial Christmas tree which eliminates need of electric wiring to be strung around the tree trunk and upon the branches in order to provide power to the lamps on the tree, thus eliminating the objectional appearance of the wiring which is often hard to visibly cover by Christmas ornaments, and wherein even when the wiring is sheathed in green color it is hard to hide.

Another object is to provide an artificial Christmas tree which accordingly eliminates the task of installing and removing the wiring from the tree, thus making it quicker and easier to decorate or dismantle the tree.

Still another object is to provide an artificial Christmas tree that is re-usable each year, and which is less risky for electrical accidents.

Other objects are to provide an electrified plastic Christmas tree which is simple in design, inexpensive to manufacture, rugged in construction, easy to use, and efficient in operation.

These and other objects will be readily apparent upon a study of the following specification and the accompanying drawing, wherein:

FIG. 1 is a side view of the invention shown partly broken away.

FIGS. 2, 3 and 4 are cross-sectional views on lines 2—2, 3—3 and 4—4 respectively of FIG. 1.

FIG. 5 is a modified design of the construction shown in FIG. 4.

FIG. 6 is a side cross-section of a modified design of the tree stand.

FIG. 7 is an enlarged detail of structure shown in FIG. 6.

FIG. 8 is a side cross-section of a modified design of tree branch lamp socket.

Referring now to the drawing in detail, and more particularly at this time to FIGS. 1 to 4, the reference numeral 10 represents an electrified plastic Christmas tree according to the present invention, wherein there is a trunk 11 supported at its lower end on a tree stand 12, the trunk having sideward branches 13 integral therewith and with twigs 14 having needles 15, and all of which are of plastic.

An electric extension cord 16 with plug 17 on one end is fitted at its other end into the lower end of the tree trunk 11 which comprises a plastic shell 18 around a central opening 19. This end of the cord 16 is connected to lower ends of a pair of vertical wire conductors 20 and 21 embedded within the trunk shell 18. At each junction 22 along the trunk 11, where four or five branches may radiate therefrom, the conductors 20 and 21 are connected by connectors 23 to branch circuits 24 embedded within solid mass 25 of branches and which connect to sockets 26 that receive lamps 27. A fine speaker wire with positive and negative connections at the branch "roots" is used. At the tree trunk top a socket 26' receives a top lamp 27' of the tree.

In an alternate wiring, paired fine speaker wires run from each socket through the branch and down the hollow trunk to common positive and negative terminals at the base or tree stand. In a further alternate wiring shown in FIG. 5, thin full length metal strips 28 connect adjacent terminals of adjacent branches. One positive and one negative strip continue to the top socket 26'. The cord 16 at the base is connected to two positive and negative strips separately.

Reference is now made to FIGS. 6 to 8 wherein alternate construction comprises a tree stand or base 29 containing a 6 or 7 watt transformer 30 to which one end of extension cord 16 is connected. Alternately, the transformer is on a plywood or fiber board base plate 31. In this construction the trunk and branches are both hollow, thus comprising a shell having inner surface 32 and outer surface 33 coated with electrically conductive epoxy 34. Each branch lamp socket 35 has a flange 36 resting against the outer surface epoxy and is secured by a hollow rivet 37 extending through electrically non-conductive washer 38 and through the shell wall so that it contacts the inner surface epoxy. Thus, the rivet transmits current to the lamp central terminal while the socket transmits current to the lamp's other terminal. Connection of the transformer to the inner and outer surfaces is through conductors 39 and 40. Conductor 40 contacts metal rivet 41 contacting the outer side epoxy; and conductor 39 contacts a metal ring 42 positioned against the inner side epoxy.

While various changes may be made in the detail construction, it is understood that such changes will be within the spirit and scope of the present invention as is defined by the appended claims.

I claim:

1. In an electrified plastic Christmas tree, the combination of a plastic tree member including a vertical trunk from which radiate branches with twigs, a lower end of said trunk being supported on a base stand, said branches and twigs having lamp sockets formed thereupon for receiving electric lamps and invisible wiring means to said lamp sockets, said means comprising electrical conductors within the interior of said tree trunk, branches and twigs, said conductors being in an electrical circuit with an external extension cord to a power source and said lamps, said means comprising said trunk, branches and twigs being hollow so to form a shell around a central opening, said opening forming an inner side of said shell coated with an electrode while an outer side of said shell is coated with a second electrode, said electrodes being connected to opposite terminals of said lamps and to a secondary side of a transformer in said base stand which on its primary side is connected by an extension cord to a household power source.

* * * * *